(12) United States Patent
Smith et al.

(10) Patent No.: US 12,168,479 B2
(45) Date of Patent: Dec. 17, 2024

(54) VEHICLE PANEL HAVING A HYBRID COMPOSITE MATERIAL CONSTRUCTION

(71) Applicant: GM Global Technology Operations LLC, Detroit, MI (US)

(72) Inventors: Zachariah Smith, Farmington Hills, MI (US); Venkateshwar R. Aitharaju, Troy, MI (US); James K. Schoenow, Frankenmuth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 17/870,924

(22) Filed: Jul. 22, 2022

(65) Prior Publication Data
US 2024/0025487 A1    Jan. 25, 2024

(51) Int. Cl.
| | |
|---|---|
| *B62D 29/00* | (2006.01) |
| *B29C 70/02* | (2006.01) |
| *B32B 5/02* | (2006.01) |
| *B32B 5/06* | (2006.01) |
| *B60R 13/02* | (2006.01) |
| *B62D 33/03* | (2006.01) |

(52) U.S. Cl.
CPC ............ *B62D 29/005* (2013.01); *B29C 70/02* (2013.01); *B32B 5/02* (2013.01); *B32B 5/06* (2013.01); *B60R 13/0243* (2013.01); *B62D 29/00* (2013.01); *B62D 33/03* (2013.01)

(58) Field of Classification Search
CPC ... B29C 70/003; B29C 70/0035; B29C 70/02; B29C 70/058; B62D 29/005; B62D 29/00; B62D 29/043; B60J 5/107; B32D 5/02; B32D 5/06; B32D 5/08; B32D 5/10

USPC .............. 296/191, 29, 30, 106, 146.9, 146.8
See application file for complete search history.

(56) References Cited

U.S. PATENT DOCUMENTS 10,632,707 B2 * 4/2020 Cura ...................... B32B 27/12
11,305,822 B2 * 4/2022 Kuntze .................... B60J 5/107

FOREIGN PATENT DOCUMENTS

| CN | 105216875 B | * | 1/2018 | ............ B60J 5/0469 |
| CN | 111391421 A | * | 7/2020 | |

OTHER PUBLICATIONS

CN105216875 Text (Year: 2018).*
CN111391421 Text (Year: 2020).*

* cited by examiner

*Primary Examiner* — Dennis H Pedder
(74) *Attorney, Agent, or Firm* — CANTOR COLBURN LLP

(57) ABSTRACT

A vehicle panel includes an outer panel layer formed from a first material. The outer panel layer includes a first side, a second side, and a peripheral edge. A second panel joining surface is arranged inwardly of the peripheral edge. An inner panel layer formed from a second material that is distinct from the first material is arranged across the second side. The second panel includes a first side portion, a second side portion, and a peripheral edge portion. A panel bonding layer is joined to the peripheral edge portion. The panel bonding layer is formed from a third material that is distinct from the second material. A bonding material is disposed between the second panel joining surface and the panel bonding layer creating a chemical bond between the panel bonding layer and the second panel joining surface.

20 Claims, 3 Drawing Sheets

VEHICLE PANEL HAVING A HYBRID COMPOSITE MATERIAL CONSTRUCTION

INTRODUCTION

The subject disclosure relates to the art of vehicles and, more particularly, to a vehicle panel having a hybrid composite material construction.

Vehicle panels are typically formed from two or more metal layers. The particular type of metal may vary. In many cases, there are structural members arranged between each metal layer. The metal layers typically include an outer layer and an inner layer that are hemmed together. The metal layers, together with the structural members provide energy absorbing properties to the panels. Fabricating and mounting the panels creates a number of manufacturing challenges.

Hemming is a costly and time consuming process. In addition to fabrication challenges, vehicle panels formed from multiple metal layers are heavy. Panel weight detracts from an overall fuel consumption rating for the vehicle. Moveable panels such as doors, lift gates, tail gates and the like, require robust hinges to support the additional weight of metal panels. Accordingly, it is desirable to form vehicle panels with selected energy absorbing qualities while, at the same time, reducing weight and manufacturing challenges.

SUMMARY

A vehicle panel, in accordance with a non-limiting example, includes an outer panel layer formed from a first material. The outer panel layer includes a first side, a second side, and a peripheral edge. A second panel joining surface is arranged inwardly of the peripheral edge. An inner panel layer formed from a second material that is distinct from the first material is arranged across the second side. The second panel includes a first side portion, a second side portion, and a peripheral edge portion. A panel bonding layer is joined to the peripheral edge portion. The panel bonding layer is formed from a third material that is distinct from the second material. A bonding material is disposed between the second panel joining surface and the panel bonding layer creating a chemical bond between the panel bonding layer and the second panel joining surface.

In addition to one or more of the features described herein the first material is metal.

In addition to one or more of the features described herein the second material comprises carbon fiber.

In addition to one or more of the features described herein the third material comprises glass fiber.

In addition to one or more of the features described herein the second panel includes a variable thickness.

In addition to one or more of the features described herein the variable thickness includes a first thickness at a first portion of the second panel and a second, increased thickness at a second portion of the second panel.

In addition to one or more of the features described herein the second portion of the second panel includes a plurality of increased thickness zones.

In addition to one or more of the features described herein the vehicle panel includes an opening having a perimetrical edge, wherein one of the inner panel layer and the panel bonding layer includes a plurality of fibers that are aligned with the perimetrical edge.

In addition to one or more of the features described herein the plurality of fibers extend substantially parallel to the perimetrical edge defining the opening.

In addition to one or more of the features described herein the vehicle panel comprises a lift gate.

A vehicle, in accordance with a non-limiting example, includes a body including a panel defining a passenger compartment, and a plurality of wheels supporting the body. The panel includes an outer panel layer formed from a first material. The outer panel layer includes a first side, a second side, and a peripheral edge. A second panel joining surface is arranged inwardly of the peripheral edge. An inner panel layer is formed from a second material that is distinct from the first material and is arranged across the second side. The second panel includes a first side portion, a second side portion, and a peripheral edge portion. A panel bonding layer is joined to the peripheral edge portion. The panel bonding layer is formed from a third material that is distinct from the second material. A bonding material is disposed between the second panel joining surface and the panel bonding layer creating a chemical bond between the panel bonding layer and the second panel joining surface.

In addition to one or more of the features described herein the first material is metal.

In addition to one or more of the features described herein the second material comprises carbon fiber.

In addition to one or more of the features described herein the third material comprises glass fiber.

In addition to one or more of the features described herein the second panel includes a variable thickness.

In addition to one or more of the features described herein the variable thickness includes a first thickness at a first portion of the second panel and a second, increased thickness at a second portion of the second panel.

In addition to one or more of the features described herein the second portion of the second panel includes a plurality of increased thickness zones.

In addition to one or more of the features described herein the vehicle panel includes an opening having a perimetrical edge, wherein one of the inner panel layer and the panel bonding layer includes a plurality of fibers that are aligned with the perimetrical edge.

In addition to one or more of the features described herein the plurality of fibers extend substantially parallel to the perimetrical edge defining the opening.

In addition to one or more of the features described herein the vehicle panel comprises a lift gate pivotally connected to the body.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
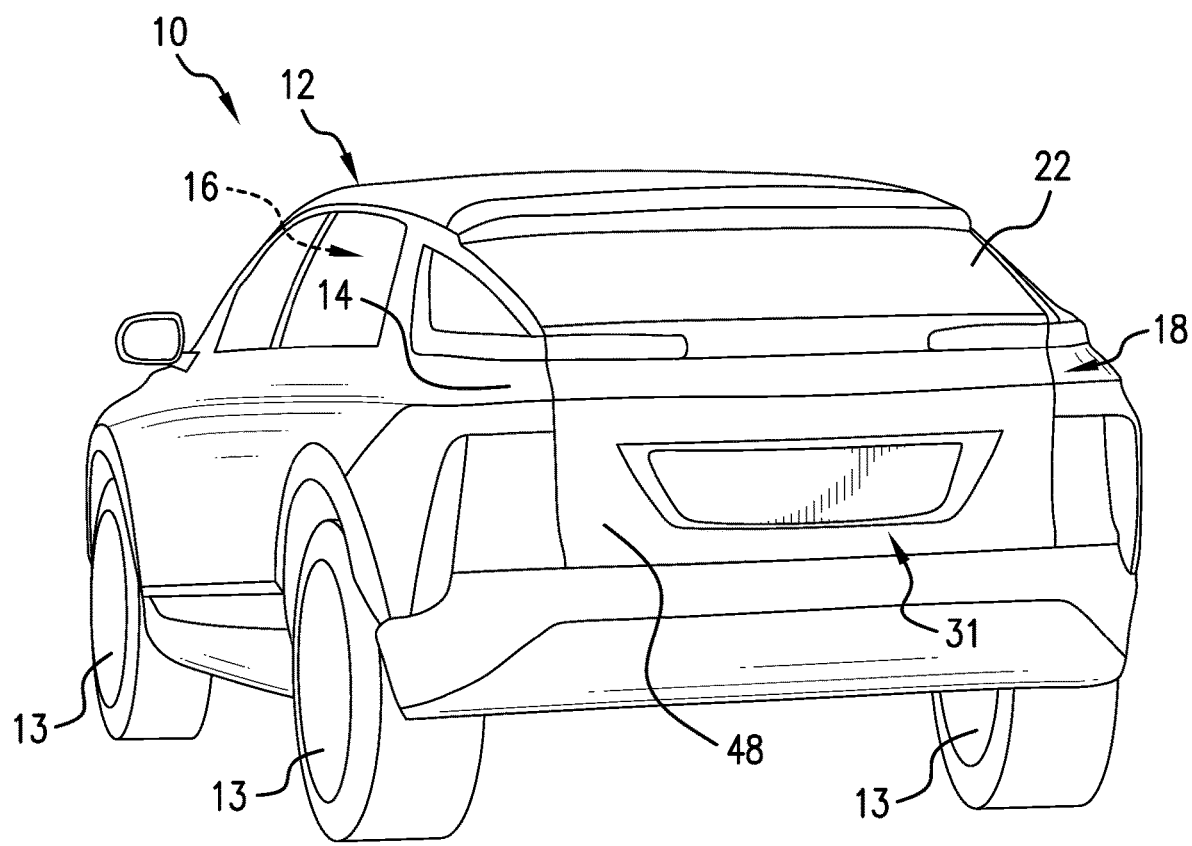
FIG. 1 is a partial perspective rear view of a vehicle including a panel having a hybrid composite material construction, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle in accordance with a non-limiting example, is indicated generally at 10 in FIG. 1. Vehicle 10 includes a body 12 supported by a plurality of wheels 13. Body 12 is formed from various panels 14 that define a passenger compartment 16. One of the panels 14 defines a lift gate 18 that is pivotally connected to body 12. Lift gate 18 may be selectively opened to provide access to a rear cargo area (not separately labeled) of vehicle 10. Lift gate 18 may also include an opening 20 (FIG. 2) that is provided with a glass cover or hatch 22. Glass cover 22 may be pivotally connected to lift gate 18 to expose opening 20.

Figure 2:
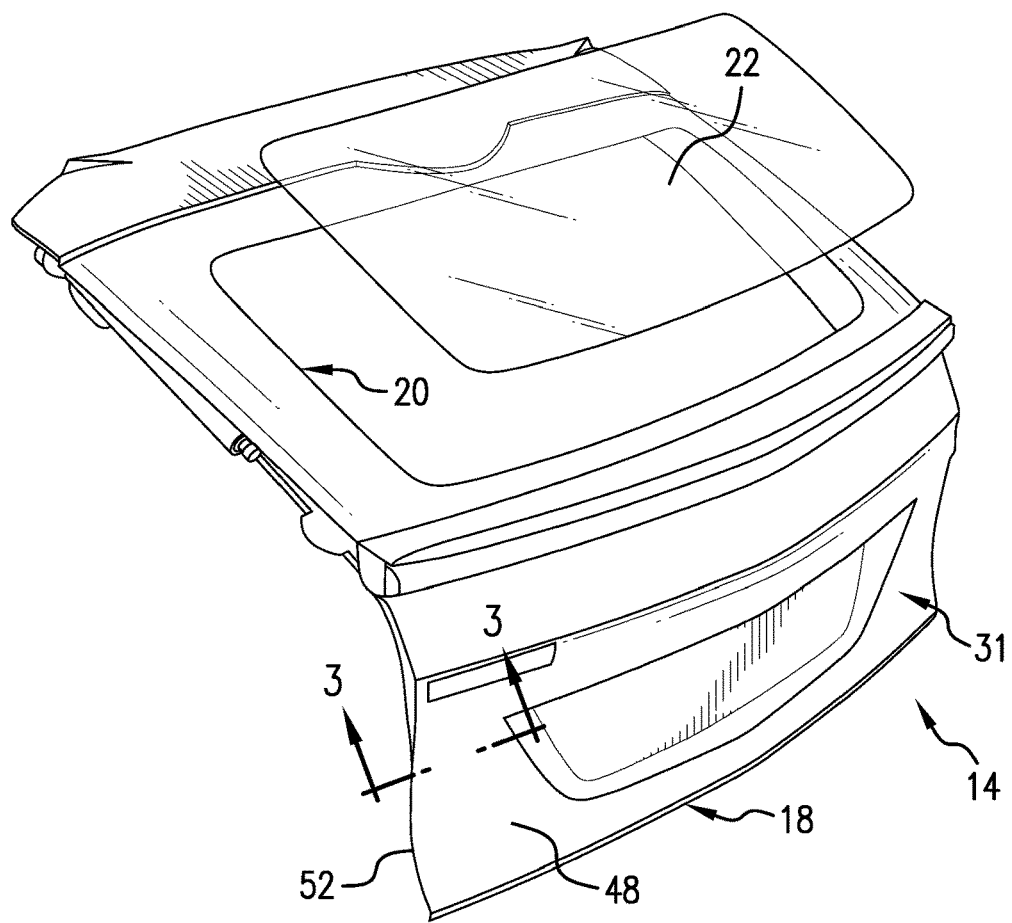
FIG. 2 is a partially disassembled view of the panel of FIG. 1 shown as a lift gate, in accordance with a non-limiting example.
Figure 3:
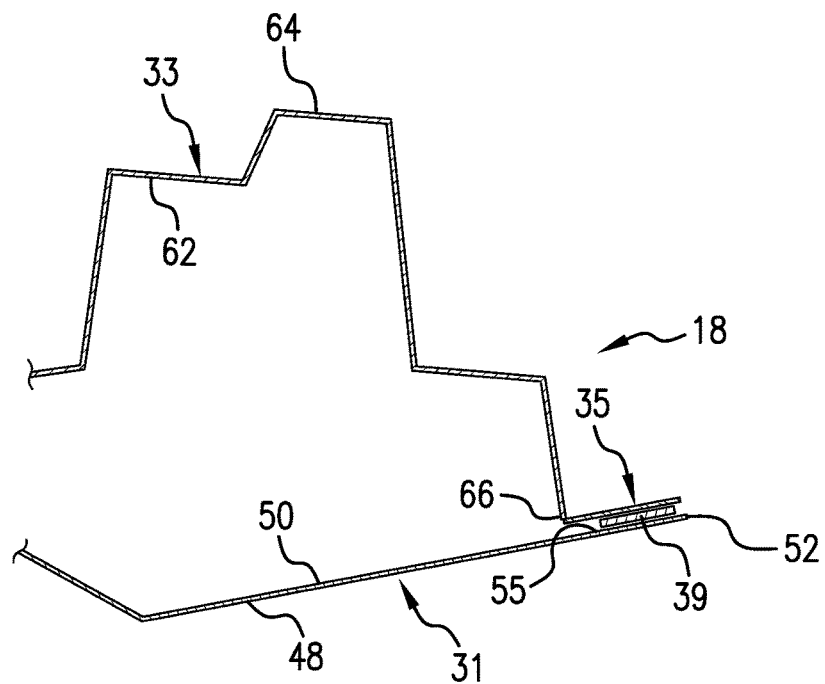
FIG. 3 is a partial cross-sectional view of the panel of FIG. 2 taken through the line 3-3.

In a non-limiting example, one or more of panels 14 include a hybrid composite material construction. That is, the panels are constructed by joining different components or layers that are formed from different materials. Referring to FIGS. 2 and 3, lift gate 18, in a non-limiting example, is formed by joining a first or outer panel layer 31 and a second or inner panel layer 33. A panel bonding layer 35 is joined to inner panel layer 33. A bonding material 39 joins panel bonding layer 35 and outer panel layer 31. Outer panel layer 31 is formed from a first material such as metal, e.g., steel, aluminum, or the like. Inner panel layer 33 is formed from a second material such as carbon fiber. The panel bonding layer is formed from a third material such as glass fiber.

Outer panel layer 31 includes a first side 48 that defines an outer surface (not separately labeled) and an opposing second side 50 that forms an interior surface (also not separately labeled). Outer panel layer 31 includes a peripheral edge 52 that defines, in part, a second panel joining surface 55. Inner panel layer 33 includes a first side portion 62 that defines an interior surface (not separately labeled), a second side portion 64 that defines an exterior surface (also not separately labeled), and a peripheral edge portion 66. First side portion 62 faces second side 50 of outer panel layer 31. Second side portion 64 while described as an exterior surface, should be understood to be exposed to passenger compartment 16 in a non-limiting example.

Panel bonding layer 35 is joined to peripheral edge portion 66 of inner panel layer 33. A joint of intermeshed fibers (not shown) is created between peripheral edge 66 and panel bonding layer 35. That is, carbon fibers that form second panel 33 and glass fibers that form panel bonding layer 35 are intermingled and bonded to one another with a resin material. Thus, second panel 33 may benefit from properties associated with carbon fiber materials while the joint with outer panel layer 31 may derive benefit from the use of glass fibers. Bonding material 39 is disposed between second panel joining surface 55 and panel bonding layer 35 to secure inner panel layer 33 to outer panel layer 31.

Figure 4:
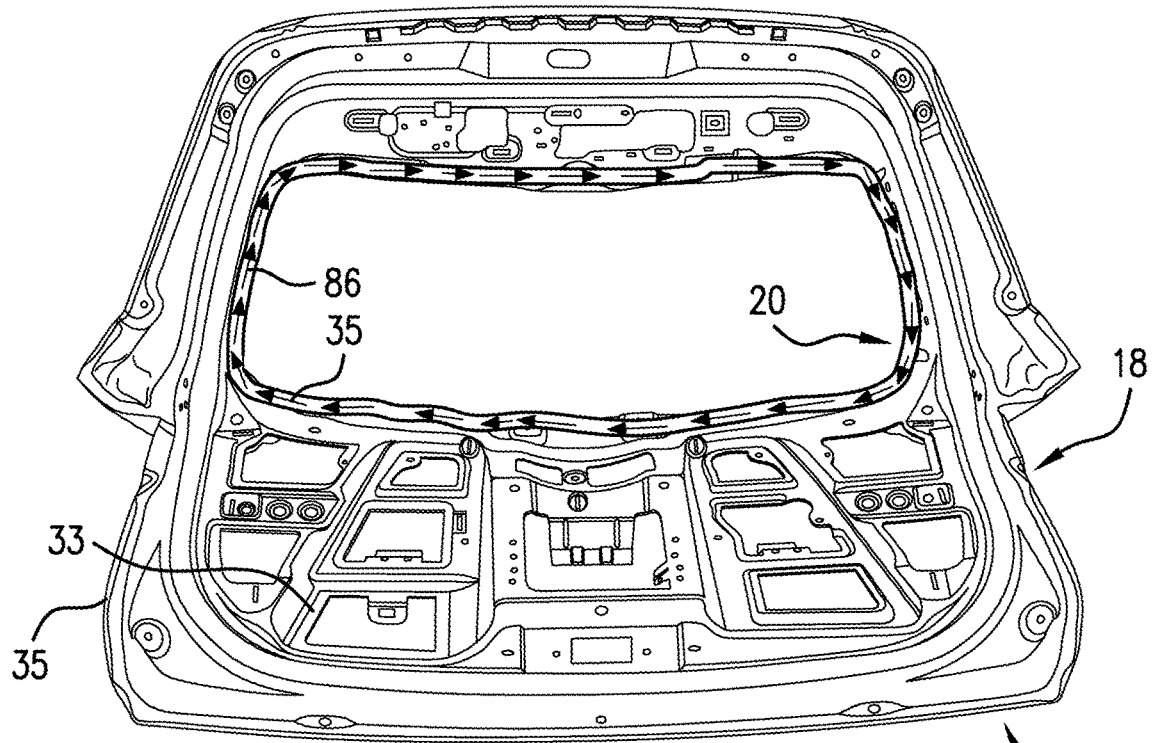
FIG. 4 is a rear view of the panel having a hybrid composite material construction, in accordance with a non-limiting example.

In a non-limiting example, opening 20 is defined by a perimetrical edge 86, FIG. 4. Panel bonding layer 35 extends to and defines an inner surface (not separately labeled) of perimetrical edge 86. Glass fibers that form panel bonding layer 35 are oriented so as to align with perimetrical edge 86. That is, as shown in FIG. 4, glass fibers that form panel bonding layer 35 align with and follow a contour of perimetrical edge 86. Aligning the glass fibers with perimetrical edge 86 provides increased strength and, at the same time, a selected flexibility for inner panel layer 33.

Figure 5:
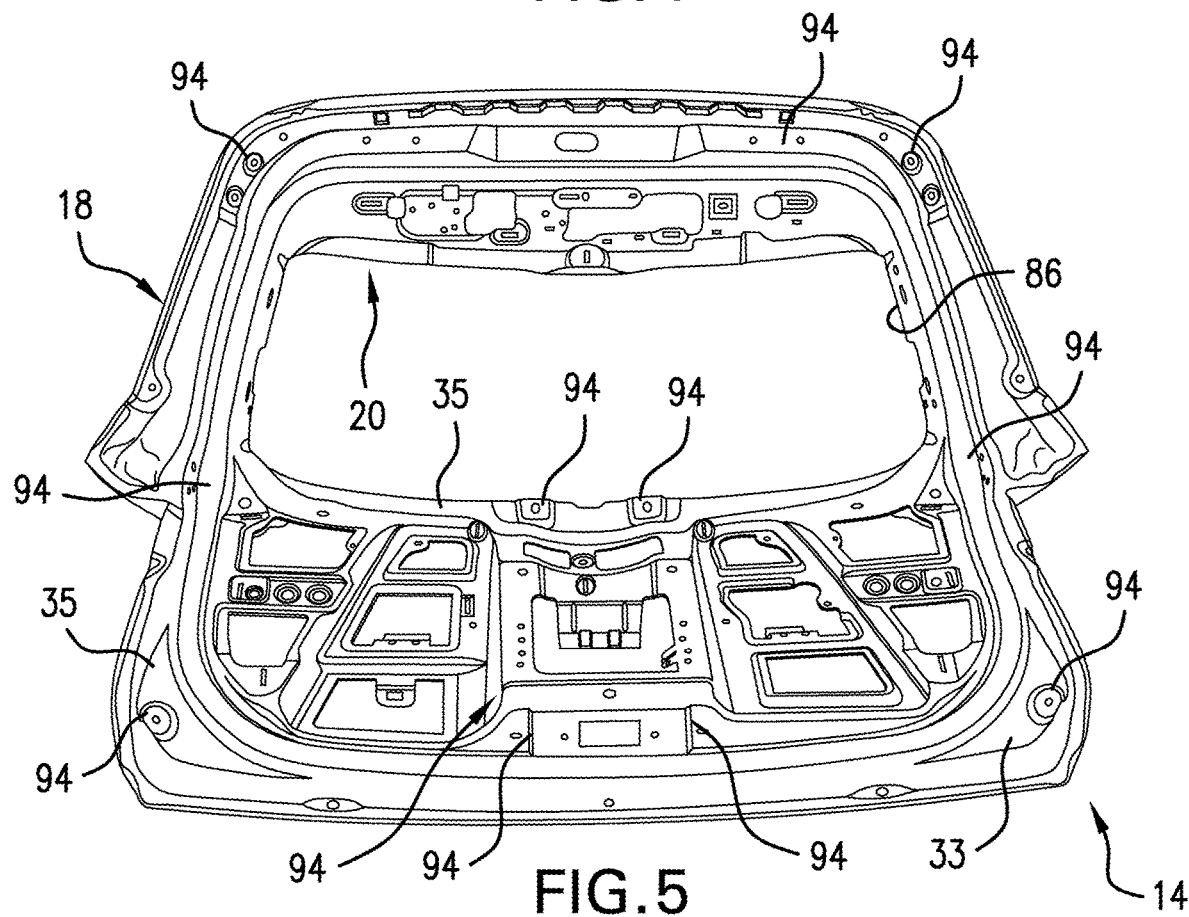
FIG. 5 is a rear view of the panel having a hybrid composite material construction including localized increased thickness zones, in accordance with a non-limiting example.

In a non-limiting example, inner panel layer 33 may include a number of increased thickness zones 94 as shown in FIG. 5. Increased thickness zones 94 may be formed by adding layers of carbon fiber to specific attachment points on panel 14. Increased thickness zones 94 support additional loads that may be stem from tightening fasteners, stresses generated by manipulating hinges, attachment points for spoilers, attachment points for bumpers and the like.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle panel comprising:
   an outer panel layer formed from a first material, the outer panel layer including a first side, a second side, and a peripheral edge, an inner panel layer joining surface is arranged inwardly of the peripheral edge;
   an inner panel layer formed from a second material that is distinct from the first material arranged across the second side, the inner panel layer including a first side portion, a second side portion, and a peripheral edge portion;
   a panel bonding layer joined to the peripheral edge portion, the panel bonding layer being formed from a third material that is distinct from the second material; and
   a bonding material disposed between the inner panel layer joining surface and the panel bonding layer creating a chemical bond between the panel bonding layer and the inner panel layer joining surface,
   wherein the vehicle panel includes an opening having a perimetrical edge, wherein one of the inner panel layer and the panel bonding layer includes a plurality of fibers that are aligned with the perimetrical edge.

2. The vehicle panel according to claim 1, wherein the first material is metal.

3. The vehicle panel according to claim 2, wherein the second material comprises carbon fiber.

4. The vehicle panel according to claim 3, wherein the third material comprises glass fiber.

5. The vehicle panel according to claim 1, wherein the inner panel layer includes a variable thickness.

6. The vehicle according to claim 5, wherein the variable thickness includes a first thickness at a first portion of the inner panel layer and a second, increased thickness at a second portion of the inner panel layer.

7. The vehicle panel according to claim 6, wherein the second portion of the inner panel layer includes a plurality of increased thickness zones.

8. The vehicle panel according to claim 1, wherein the plurality of fibers extend substantially parallel to the perimetrical edge defining the opening.

9. The vehicle panel according to claim 1, wherein the vehicle panel comprises a lift gate.

10. A vehicle comprising:
a body including a vehicle panel defining a passenger compartment; and
a plurality of wheels supporting the body, wherein the vehicle panel comprises:
an outer panel layer formed from a first material, the outer panel layer including a first side, a second side, and a peripheral edge, an inner panel layer joining surface is arranged inwardly of the peripheral edge;
an inner panel layer formed from a second material that is distinct from the first material arranged across the second side, the inner panel layer including a first side portion, a second side portion, and a peripheral edge portion;
a panel bonding layer joined to the peripheral edge portion, the panel bonding layer being formed from a third material that is distinct from the second material; and
a bonding material disposed between the inner panel layer joining surface and the panel bonding layer creating a chemical bond between the panel bonding layer and the inner panel layer joining surface,
wherein the vehicle panel includes an opening having a perimetrical edge, wherein one of the inner panel layer and the panel bonding layer includes a plurality of fibers that are aligned with the perimetrical edge.

11. The vehicle according to claim 10, wherein the first material is metal.

12. The vehicle according to claim 11, wherein the second material comprises carbon fiber.

13. The vehicle according to claim 12, wherein the third material comprises glass fiber.

14. The vehicle according to claim 10, wherein the inner panel layer includes a variable thickness.

15. The vehicle according to claim 14, wherein the variable thickness includes a first thickness at a first portion of the inner panel layer and a second, increased thickness at a second portion of the inner panel layer.

16. The vehicle according to claim 15, wherein the second portion of the inner panel layer includes a plurality of increased thickness zones.

17. The vehicle according to claim 10, wherein the plurality of fibers extend substantially parallel to the perimetrical edge defining the opening.

18. The vehicle according to claim 10, wherein the vehicle panel comprises a lift gate pivotally connected to the body.

19. The vehicle panel according to claim 1, wherein the opening is configured to be provided with a glass cover.

20. The vehicle according to claim 1, wherein the opening is provided with a glass cover.

* * * * *